May 26, 1936.　　　　L. C. TURNOCK　　　　2,042,241
SUPPORT
Filed Dec. 15, 1933　　　　2 Sheets-Sheet 1

INVENTOR
LAWRENCE C. TURNOCK.
BY George W. Woodling
ATTORNEY

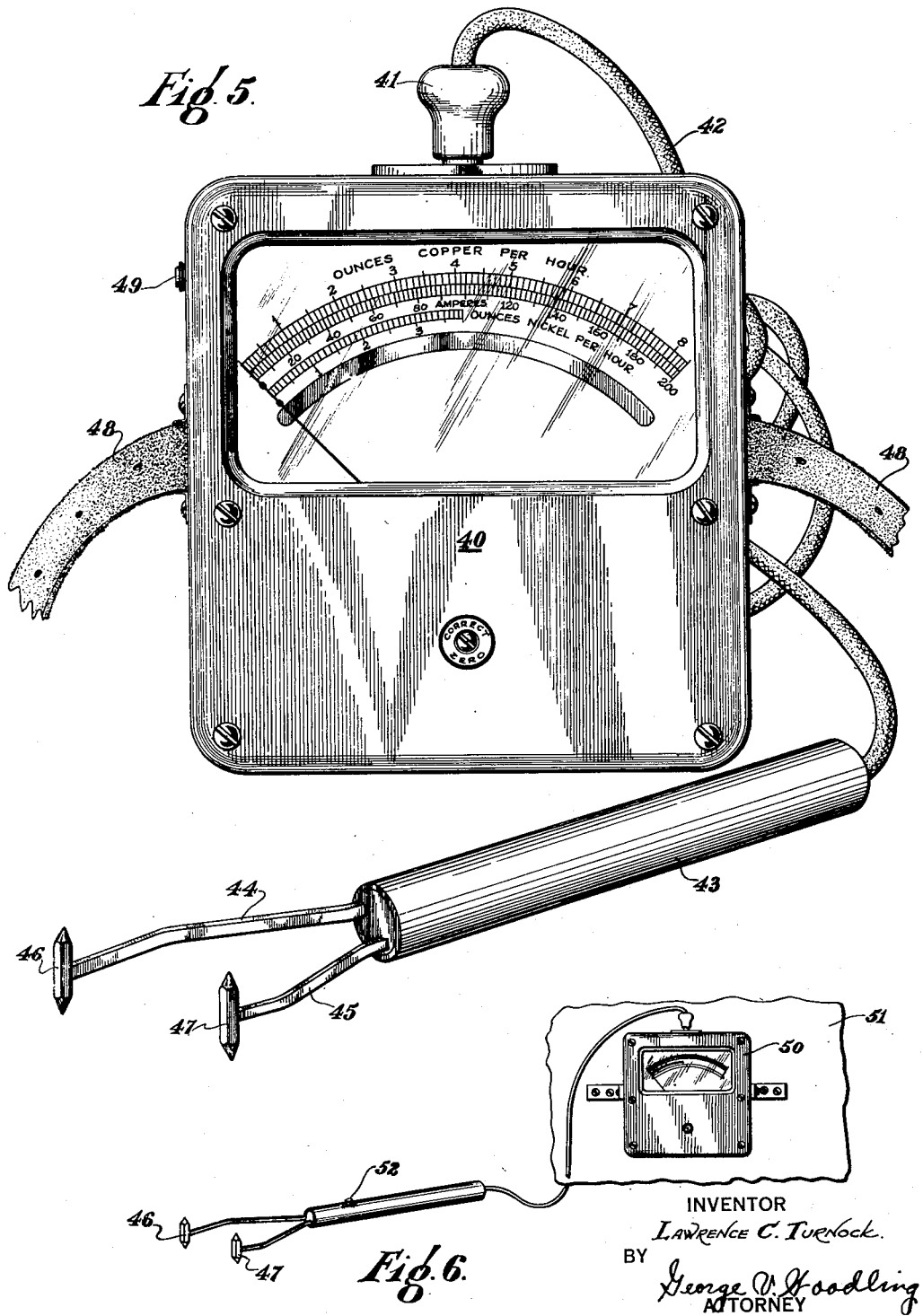

Patented May 26, 1936

2,042,241

UNITED STATES PATENT OFFICE 2,042,241

SUPPORT

Lawrence C. Turnock, Cleveland Heights, Ohio

Application December 15, 1933, Serial No. 702,566

13 Claims. (Cl. 204—5)

My invention relates to supports and more particularly to supports for articles to be plated.

An object of my invention is the provision of so constructing a support that it not only constitutes a support for articles to be plated, but also provides a shunt for an electrical meter to measure the current flowing through the support.

Another object of my invention is to provide for utilizing a portion of a support for articles to be plated as a shunt for an electrical meter to measure the current flowing through the support.

A further object of my invention is to provide for constructing a portion of a support for articles to be plated of such material that possess a substantially zero temperature coefficient of resistance, and for measuring the voltage drop across said portion to determine the current flowing through the support.

A still further object of my invention is to provide for protecting the shunting portion of my support against corrosion, and thus prevent any change in the physical dimensions of the shunting portion, which change, if allowed to occur, would cause the meter to give an inaccurate indication of the current flowing through the support.

Another object of my invention is to provide for so constructing a support for articles to be plated that the lower portion thereof, which is partly immersed in, or positioned immediately above, the plating solution, may be replaced by a new lower portion while leaving the other portion of the support intact.

A further object of my invention is the provision of a contacting instrument having two spaced contacts electrically connected to a meter for measuring the current flowing through my support for articles to be plated.

A still further object of my invention is the provision of a meter calibrated to read both the current flowing through my support for articles to be plated and the rate at which the deposition is taking place upon the article being plated.

Other objects and a more specific understanding of my invention may be had by referring to the following description, taken in combination with the accompanying drawings, in which like parts are designated by like reference characters, and in which:

Figure 5 is a view of a portable electrical meter, together with a contacting instrument having two spaced contacts, for measuring the current flowing through the shunting element of my support; and Figure 6 is a small view similar to Figure 5, except that the electrical meter is stationarily mounted upon a fixed support or a wall.

Figure 1:
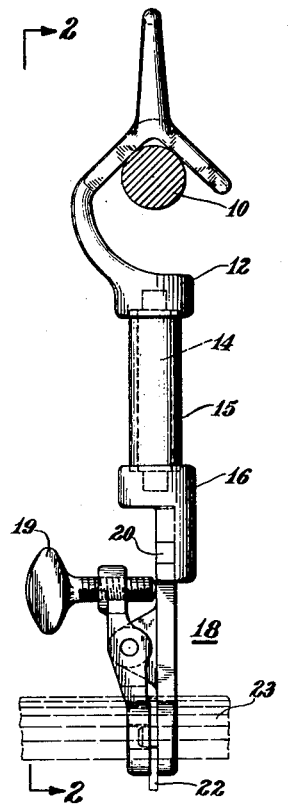
Figure 1 is a side elevational view of my support for articles to be plated.

With particular reference to the drawings, my support comprises, in general, an upper hook portion 12 adapted to engage and to make a good electrical contact with an electroplating bus bar 10, a lower suspension portion 16 carrying a clamping arrangement 18 that is adapted to engage the article 22 to be plated, and a shunting element 14 disposed to interconnect the upper hook portion 12 and the lower suspension portion 16. As illustrated, the upper hook portion 12 may be provided with a suitable hand grip to facilitate the handling of my support and the article to be plated.

The shunting element 14 is constructed of special material, such as an alloy having a substantially zero temperature coefficient of resistance. I preferably employ a shunting element having a substantially zero temperature coefficient of resistance, because, if a change in temperature caused by the current flowing through the support, or by any other condition, were allowed to vary the resistance of the shunting element, the meter would give an inaccurate indication of the current flowing through the support. As a further means to avoid an inaccurate indication of the current flowing through the support, each end of the shunting element 14 is securely and firmly connected, by means of solder or suitable welding means, within a longitudinal opening provided respectively in the upper hook portion 12 and the lower suspension portion 16. However, prior to connecting the shunting element 14 between the upper hook portion 12 and the lower suspension portion 16, a non-corrosive shield 15 is inserted over the shunting element. This shield prevents the fumes from the plating solution, as well as the plating solution itself which may be splashed thereon, from reacting with the shunting element and thus changing its physical dimensions, which would if allowed to occur, cause the meter to give an inaccurate indication of the current flowing through the support.

Figure 2:
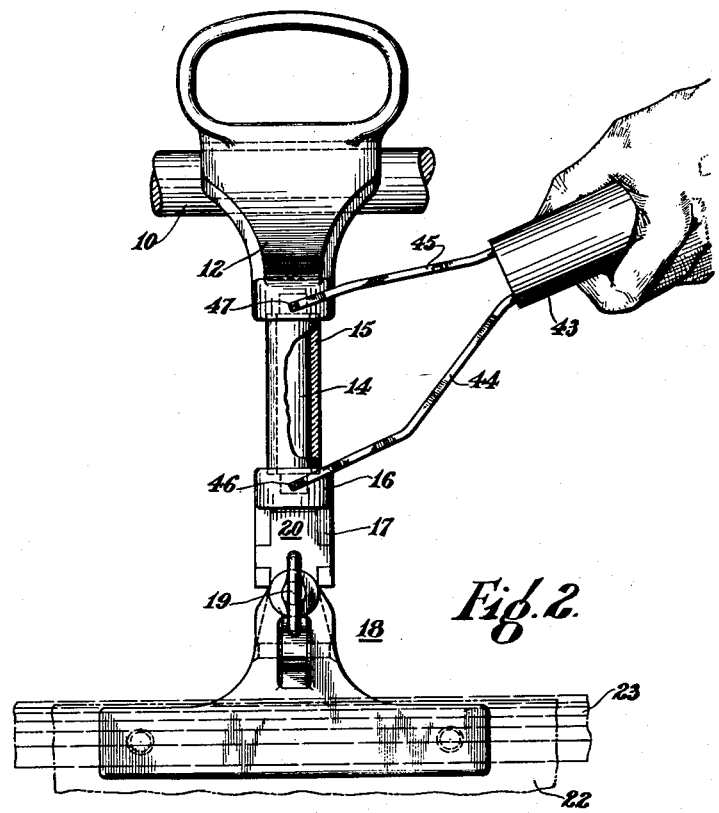
Figure 2 is a front elevational view of my support for articles to be plated, the shield of which being partly broken away to show the shunting element that is adapted to be connected in circuit relation with an electrical meter by means of a contacting instrument having two spaced contacts.
Figure 3:
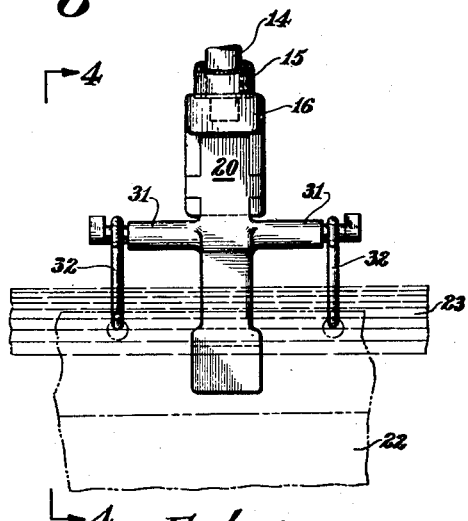
Figure 3 is a fragmentary front view of my support showing a modified clamping arrangement for engaging the article to be plated.
Figure 4:
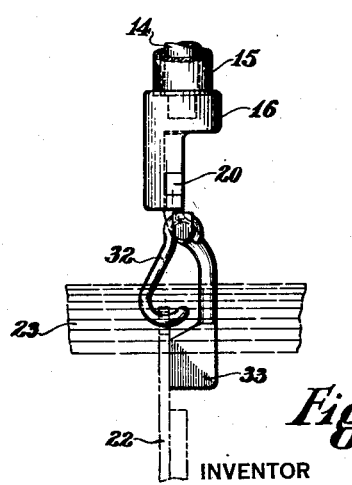
Figure 4 is a fragmentary side view of the modified clamping arrangement shown in Figure 3.

Removably connected to the lower suspension portion 16 is a clamping arrangement 18 for engaging the article to be plated. In Figures 1 and 2, the clamping arrangement 18 comprises two co-operatively associated clamping jaws adjustably actuated by means of a screw 19. In Figures 3 and 4, I illustrate a modified form of the clamping arrangement. As illustrated, this modified form comprises two spaced hooks 32, carried by two winged projections 31, for engaging suitable holes in the article to be plated, so that, when the article is immersed in the plating solution, it is constrained by gravity to press firmly against the flat surface of the lowermost boss 33. This modified clamping arrangement, as well as the form shown in Figures 1 and 2, insures a very good electrical contact between the article to be plated and its support.

As illustrated, in actual operation, the lowermost portion of the clamping arrangement is immersed in the plating solution 23. As a result, this part is directly affected by the plating solution, while the remaining upper part is substantially unaffected. This means that the lower part has a relatively short life, whereas the upper part has a relatively long life. Therefore, in the interest of economy, I provide for removably connecting the clamping arrangement to the lower suspension portion 16. This removable connection may, however, be effected in any suitable manner. As shown in the drawings, the lower suspension portion 16 is provided with a cross-shaped depressed portion and the clamping arrangement is provided with a complementary cross-shaped engaging portion 20, so that, when the two are connected together, there is an interlocking engagement between them. The interlocking engagement may, in order to insure a good electrical connection, be soldered together. To change the clamping arrangement, it is only necessary to unsolder the old clamping arrangement and resolder a new clamping arrangement to the lower suspension portion 16. In this manner, the upper part of my support, which includes the shunting element 14, may be used for an indefinite length of time.

For measuring the voltage drop across, and thus the current flow through, the shunting element 14, I utilize a contacting instrument 43 having two spaced contacts 46 and 47 electrically connected to a portable meter 40, which may be carried by a suitable strap 48 looped over the operator's shoulder. That part of the support which the two spaced contacts 46 and 47 engage may be chromium plated, so that there is always a clean surface to make a good electrical contact. In actual practise, the operator generally has to reach downwardly when using the contacting instrument 43, and, for his convenience, the two spaced prongs 44 and 45 are of unequal length to make the contact points 46 and 47 register in a vertical position with the shunting element 14.

As illustrated in Figure 5, the meter has three scales; the upper and the lower scales are calibrated to give the rate at which the deposition is being deposited on the article to be plated, and the intermediate scale is calibrated in amperes to give the value of the current flowing through shunting element 14. The "rate of deposition" scales may be conveniently calibrated to read "ounces of copper per hour", "ounces of nickel per hour", or the unit weight of any other material per unit length of time, such as disclosed and claimed in the applicant's Patent No. 1,527,095, issued February 17, 1925.

In view of the fact that the meter 40 is of the millivoltmeter type, the operator should make sure that there is a good electrical contact at both of the control points 46 and 47 before depressing the push-button switch 49 on the meter of Figure 5.

The meter cord 42 that is connected to the contacting instrument 43 may be disconnected from the meter by removing the plug 41. The contacting instrument may then be used with another meter. The contacts 46 and 47 are provided with dual points, so that the operator may conveniently read the operating condition of two adjacent supports merely by swinging the dual contact points from the one support to the other without turning the contacting instrument 43 over in his hand.

In Figure 6 I show a stationary meter 50 mounted upon a support or wall 51. With this arrangement, the push-button switch 52 for the meter is mounted within the contacting instrument, so that the operator merely depresses it to complete the electrical circuit between the support and the meter.

By means of my invention, it is possible at any instant during the plating operation to determine quickly and effectively the current flowing through, or the rate at which the plating is taking place upon, the article or articles being plated that are suspended by each individual support. The applicant finds that, in practise, the contact resistance between the support and the plating bar is a variable quantity, thereby causing a variation in the amount of plate received by articles of the same surface area which remain in the plating tank for the same period of time. Heretofore in cases where the operator suspected a poor electrical contact between the engaging surfaces of the support and the plating bar, the practise has been for the operator to lift the support from the plating bar and clean both the engaging surfaces of the support and the plating bar with sandpaper or some other equivalent method. However, this method offered no positive assurance to the operator that he had minimized the contact resistance because when the support is re-suspended upon the plating bar after the cleaning operation has taken place there is no way to actually determine the contact resistance. Thus, there is a possible chance that the condition causing the high contact resistance has not been removed for the reason that in some cases the operator is unable to discern the condition causing the high resistance by observation. On the other hand, by means of my invention it is possible for the operator, without removing the support from the plating rod, to determine whether or not the contact resistance between the support and the plating rod is of a low value by observing the current flowing through the support. Thus, if the operator observes that the current flowing through certain supports in the plating tank is less than the current flowing through certain other supports in the plating tank sustaining articles of equal plating area, it is an indication to the operator that the low current values are caused by a high contact resistance between the respective supports and the plating rods. Therefore, when the operator finds that there is a high contact resistance between one or more of the supports and the plating rod he may take the necessary steps to remove the high contact resistance and thus reduce the time required to give the proper plating upon the articles being plated.

Since certain changes in my invention may be made without departing from the spirit and scope thereof, it is intended that all matters contained in the foregoing description and shown in the accompanying drawings shall be interpreted as illustrative and not in a limiting sense.

I claim as my invention:

1. An article support adapted to be utilized in connection with an electrical meter for reading the electrical condition of the supported article by measuring the potential difference between two portions of the support comprising, in combination, a portion through which the current passes, means connected to the current carrying portion for holding the article that is to be supported, said current carrying portion having a part which has a smaller cross-sectional area and a higher current density than the holding means and another part being provided with two spaced portions that may be connected in circuit relation with the meter for measuring the potential difference therebetween, and thus the electrical condition of the supported article, and means for protecting the current carrying portion.

2. An article support adapted to be utilized in connection with an electrical meter for reading the electrical condition of the supported article by measuring the potential difference between two portions of the support comprising, in combination, two spaced portions interconnected by a third portion through which current passes, said third portion having a smaller cross-sectional area and a higher current density than the spaced portions, means for protecting the third portion, and means connected to one of the spaced portions for holding the article that is to be supported, said spaced portions being such that they may be connected in circuit relation with the meter for measuring the potential difference therebetween and thus the electrical condition of the supported article.

3. An article support adapted to be utilized in connection with an electrical meter for reading the electrical condition of the supported article by measuring the potential difference between two portions of the support comprising, in combination, two spaced portions interconnected by a third portion through which current passes, said third portion having a smaller cross-sectional area and a higher current density than the spaced portions, and means connected to one of the spaced portions for holding the article that is to be supported, said spaced portions being such that they may be connected in circuit relation with the meter for measuring the potential difference therebetween and thus the electrical condition of the supported article.

4. An article support adapted to be utilized in connection with an electrical meter for reading the electrical condition of the supported article by measuring the potential difference between two portions of the support comprising, in combination, a portion through which the current passes, said portion being constructed of such material that possesses a substantially zero temperature coefficient of resistance, means connected to the current carrying portion for holding the article that is to be supported, said current carrying portion being provided with two spaced portions that may be connected in circuit relation with the meter for measuring the potential difference therebetween, and thus the electrical condition of the supported article.

5. An article support adapted to be utilized in connection with an electrical meter for reading the electrical condition of the supported article by measuring the potential difference between two portions of the support comprising, in combination, two spaced portions interconnected by a third portion through which current passes, said third portion being constructed of such material that possesses a substantially zero temperature coefficient of resistance, means connected to one of the spaced portions for holding the article that is to be supported, said spaced portions being such that they may be connected in circuit relation with the meter for measuring the potential difference therebetween, and thus the electrical condition of the supported article.

6. An article support adapted to be utilized in connection with an electrical meter for reading the electrical condition of the supported article by measuring the potential difference between two portions of the support comprising, in combination, two spaced portions interconnected by a third portion through which current passes, said third portion being constructed of such material that possesses a substantially zero temperature coefficient of resistance, means connected to one of the spaced portions for holding the article that is to be supported, said spaced portions being such that they may be connected in circuit relation with the meter for measuring the potential difference therebetween, and thus the electrical condition of the supported article, and means for protectively shielding the third portion.

7. An article support adapted to be utilized in connection with a contacting instrument and an electrical meter for reading the electrical condition of the supported article by measuring the potential difference between two portions of the support comprising, in combination, a portion through which the current passes, means connected to the current carrying portion for holding the article that is to be supported, said current carrying portion having a part which has a smaller cross-sectional area and a higher current density than the holding means and another part being provided with two spaced portions that may be engaged by the contacting instrument which is electrically connected to the meter for measuring the electrical condition of the supported article.

8. An article support adapted to be utilized in connection with a contacting instrument and an electrical meter for reading the electrical condition of the supported article by measuring the potential difference between two portions of the support comprising, in combination, two spaced portions interconnected by a third portion through which current passes, said third portion being constructed of such material that possesses a substantially zero temperature coefficient of resistance, means connected to one of the spaced portions for holding the article that is to be supported, said spaced portions being such that they may be engaged by the contacting instrument which is electrically connected to the meter for measuring the electrical condition of the supported article.

9. The combination of a shunting support for an article to be plated and an electrical meter to read the electrical condition of the article being plated comprising, in combination, a support having a shunting portion, said shunting portion being constructed of such material that possesses a substantially zero temperature coefficient of resistance, an electrical meter, and means for connecting the shunting portion in circuit relation with the electrical meter.

10. An article support adapted to be suspended from an electroplating bus bar comprising, in combination, an upper portion adapted to engage, and suspend from the bus bar, a lower suspension portion, a shunting element for interconnecting the upper engaging portion and the lower suspension portion, means for holding the article to be plated, and means for detachably connecting the holding means to the lower suspension portion.

11. An article support adapted to be suspended from an electroplating bus bar comprising, in combination, an upper portion adapted to engage, and suspend from the bus bar, a lower suspension portion, a shunting element for interconnecting the upper engaging portion and the lower suspension portion, means for protecting the shunting element, means for holding the article to be plated, and means for detachably connecting the holding means to the lower suspension portion.

12. An article support adapted to be utilized in connection with an electrical meter for reading the electrical condition of the supported article by measuring the potential difference between two portions of the support comprising, in combination, a portion through which the current passes, means connected to the current carrying portion for holding the article that is to be supported, said current carrying portion having a smaller cross-sectional area and a higher current density than that of the holding means and being provided with two spaced portions that may be connected in circuit relation with the meter for measuring the potential difference therebetween, and thus the electrical condition of the supported article.

13. An electrical shunting support for article comprising, in combination, a shunting portion through which current passes, and means connected to the shunting portion for holding the article, said shunting portion having a smaller cross-sectional area and a higher current density than that of the holding means and being provided with two spaced portions which may be shunted.

LAWRENCE C. TURNOCK.